United States Patent Office 3,301,658
Patented Jan. 31, 1967

3,301,658
FERTILIZER
John Rex Arthur and Russell James Nunn, Ipswich, Suffolk, England, assignors to Fisons Fertilizers Limited, Suffolk, England
No Drawing. Filed Aug. 5, 1963, Ser. No. 300,075
Claims priority, application Great Britain, Aug. 14, 1962, 31,062/62
13 Claims. (Cl. 71—50)

The present invention relates to high-analysis mixed fertilizers containing ammonium nitrate and having relatively low caking tendencies.

The marked tendency of mixed fertilizer materials containing ammonium nitrate to cake is a well-known phenomenon and several solutions to this problem having been proposed. One method of approach has been to find substances which can be coated on to the granules and which reduces caking. Another approach has been to obtain the granules in as dry a condition as possible. Yet another approach has been to incorporate small amounts of a foreign salt such as a magnesium salt. All these experiments can be relatively costly.

Surprisingly it has now been found that high analysis granular mixed fertilizer compositions having remarkably low caking properties can be formed from at least ammonium nitrate, ammonium sulphate and triple superphosphate providing that the triple superphosphate is the main source of monocalcium phosphate added and providing that ammonium sulphate and monocalcium phosphate as derived from superphosphate materials are present in given proportions relative to one another.

Accordingly the present invention is for a process for preparing a granular fertilizer composition and the product obtained thereby which comprises forming a mixture containing, inter alia, at least one nitrate salt, at least one sulphate salt and triple superphosphate in the presence of water and granulating the mixture, the triple superphosphate providing at least 60% by weight of the total water-soluble $P_2O_5$ in the final composition and the sulphate salt being added in such proportions as to provide substantially at least one mole of sulphate for every mole of monocalcium phosphate present in the mixture, the monocalcium phosphate being derived from triple superphosphate and any single superphosphate present.

In the context of this specification triple superphosphate is the product formed by the reaction of phosphate rock with phosphoric acid and single superphosphate is the product formed by the reaction of phosphate rock with sulphuric acid.

The nitrate salt may be ammonium nitrate, potassium nitrate, sodium nitrate or magnesium nitrate. Preferably the nitrate salt is ammonium nitrate. The proportion of nitrogen added to the mixture and therefore present in the granular fertilizer composition is suitably in the range 2 to 25% by weight as nitrogen based on the weight of the fertilizer composition. The proportion of nitrate nitrogen in the fertilizer composition obtained by the process of the present invention is suitably in the range 1 to 15% by weight as N based on the weight of the fertilizer composition.

The sulphate salt may be ammonium sulphate, ammonium sulphate nitrate, potassium sulphate, sodium sulphate or magnesium sulphate. Preferably the sulphate salt is ammonium sulphate.

The molar ratio of sulphate salt to monocalcium phosphate as derived from superphosphate materials is suitably in the range 1:1 to 3:1. Preferably, however, the molar ratio of sulphate salt, for example ammonium sulphate, to monocalcium phosphate is substantially 1:1. If there is an excess over this 1:1 proportion the extent of this excess which is permissible will depend on the amount of unreacted ammonium nitrate in the fertilizer composition, the excess being small if appreciable concentrations of unreacted ammonium nitrate are present but increasing as the proportion of unreacted ammonium nitrate decreases.

In addition to the water-soluble $P_2O_5$ derived from triple superphosphate, water soluble $P_2O_5$ may also be provided in the form of single superphosphate, monoammonium phosphate or diammonium phosphate but the amount should be less than that amount which would yield 40% by weight of the water-soluble $P_2O_5$ in the granular fertilizer composition. Generally speaking the quantities of single superphosphate, monoammonium phosphate or diammonium phosphate are minimal and it is preferred that all the water-soluble $P_2O_5$ be derived from triple superphosphate alone. If it is desired to add substantial quantities of $P_2O_5$ to the final fertilizer this is best done by blending with the granular fertilizer composition obtained by the process of the present invention separate granules containing monoammonium phosphate, triple superphosphate or single superphosphate.

The proportion of phosphate as water-soluble $P_2O_5$ in the fertilizer composition of the present invention is preferably in the range 7 to 30% by weight as $P_2O_5$ based on the weight of the fertilizer composition.

As well as including nitrogen in the granular fertilizer composition in the form of ammonium ions or nitrate ions it may also be included as urea or urea salts. Preferably, a small amount of urea or urea salt is present in the fertilizer as a thermal stabilizer.

Preferably, a potassium salt is included in the granular fertilizer of the present invention as, for example, potassium chloride. When potassium is added in the form of its chloride its reaction with ammonium nitrate assists the processing of the fertilizer. The proportion of potassium salt in the fertilizer composition of the present invention is preferably 7–30% by weight as $K_2O$ based on the weight of the fertilizer composition.

In a preferred embodiment of the present invention a process is provided for preparing granular fertilizer compositions which comprises forming a mixture containing ammonium nitrate, ammonium sulphate, potassium chloride and triple superphosphate in the presence of water and granulating the mixture, the triple superphosphate providing substantially all the water-soluble $P_2O_5$ in the mixture and the ammonium sulphate and triple superphosphate being added in such proportions as to provide substantially one mole of ammonium sulphate for every mole of monocalcium phosphate derived from triple superphosphate. Preferably at least one mole of potassium chloride is provided for every mole of ammonium nitrate but the required $N:P_2O_5$; $K_2O$ ratio may not permit this.

The water which is present during the formation of the mixture of fertilizer materials and its granulation is sufficient to allow reaction to take place between the components of the fertilizer. Suitably this water amounts to 1 to 5% by weight based on the weight of the fertilizer composition. A certain amount of this water may be added as a constituent of triple superphosphate. Additional water may be added as such or along with the other components of the fertilizer composition such as ammonium nitrate.

The granular composition of the present invention may be formed by mixing the ingredients in a suitable apparatus such as for example in a rotating drum. The ingredients may be mixed as powders, slurries or solutions. For example ammonium nitrate is preferably added as a strong aqueous solution at a temperature of about 90° C. Water may be added as such or as steam or as a salt solution.

The mixture may be formed at ambient or elevated temperatures, and is preferably then granulated and dried by a process which comprises tumbling at ambient or elevated temperatures and finally tumbling at an elevated temperature. The elevated temperatures may be obtained by the passage of hot air and/or gaseous products of combustion.

The following examples in which parts are by weight are given to illustrate the present invention:

Example 1

A granular fertilizer composition having an analysis of $N:P_2O_5:K_2O$ of 13:13:20 was formulated from the following ingredients:

| | Parts |
|---|---|
| Ammonium nitrate | 29.5 |
| Ammonium sulphate | 9.9 |
| Triple superphosphate | 19.8 |
| Monoammonium phosphate | 6.4 |
| Potassium chloride | 33.7 |
| Urea | 0.2 |
| Moisture | 4 |

The granules were formed by spraying ammonium nitrate in the form of a hot solution containing 90% by weight of ammonium nitrate on to a powdered material in a rotating drum, the powdered material comprising the other ingredients and fines recycled from the product stage. The granules obtained from the rotating drum at a temperature of 45 to 55° C. were dried in a rotary drier at 95 to 105° C., and were then screened, oversize being ground and returned with the fines to the rotating drum. The product granules had a moisture content of 0.5% and showed very good non-caking properties.

Example 2

A granular fertilizer composition having an analysis of $N:P_2O_5:K_2O$ of 20:10:10 was formulated from the following ingredients:

| | Parts |
|---|---|
| Ammonium nitrate | 45.7 |
| Ammonium sulphate nitrate | 16.4 |
| Triple superphosphate | 20.3 |
| Potassium chloride | 16.9 |
| Urea | 0.2 |
| Moisture | 3.0 |

The composition was granulated in the same way as the composition in Example 1, a product containing 0.5% moisture being obtained and being in the form of granules showing remarkably little tendency to cake.

Example 3

A granular fertilizer composition having an analysis of $N:P_2O_5:K_2O$ of 21:10.5:10.5 was formulated from the following ingredients:

| | Parts |
|---|---|
| Ammonium nitrate | 59.0 |
| Triple superphosphate | 20.7 |
| Potassium chloride | 5.8 |
| Potassium sulphate | 13.8 |
| Urea | 0.2 |
| Moisture | 3.0 |

The composition was granulated in the same way as the composition in Example 1, a product containing 0.5% moisture being obtained which showed good non-caking properties.

Example 4

A granular fertilizer composition having an analysis of $N:P_2O_5:K_2O$ of 13.4:13.4:20.7 was formulated from the following ingredients:

| | Parts |
|---|---|
| Ammonium nitrate | 14.6 |
| Potassium nitrate | 44.4 |
| Triple superphosphate | 26.9 |
| Ammonium sulphate | 13.4 |
| Urea | 0.2 |
| Moisture | 4.0 |

The composition was granulated in the same way as the composition in Example 1, a product containing 0.5% moisture being obtained which showed good non-caking properties.

We claim:

1. A granular fertilizer composition which comprises at least one nitrate salt, at least one sulphate salt and triple superphosphate, the nitrate salt being selected from the group consisting of ammonium nitrate, sodium nitrate, potassium nitrate and magnesium nitrate, the sulphate salt being selected from the group consisting of ammonium sulphate, ammonium sulphate nitrate, potassium sulphate, sodium sulphate and magnesium sulphate, the triple superphosphate providing at least 60% by weight of the total water-soluble $P_2O_5$ in the composition, the sulphate salt being present in such proportions as to provide substantially one to three moles of sulphate salt for every mole of monocalcium phosphate present in the initial mixture and the proportion of nitrogen in the composition being 2 to 25% by weight based on the weight of the composition.

2. A process for preparing granular fertilizer compositions which comprises forming a mixture containing water and, inter alia, at least one nitrate salt, at least one sulphate salt and triple superphosphate and granulating the mixture, the nitrate salt being selected from the group consisting of ammonium nitrate, sodium nitrate, potassium nitrate and magnesium nitrate, the sulphate salt being selected from the group consisting of ammonium sulphate, ammonium sulphate nitrate, potassium sulphate, sodium sulphate and magnesium sulphate, the triple superphosphate providing at least 60% by weight of the total water-soluble $P_2O_5$ in the composition, the sulphate salt being present in such proportions as to provide substantially one to three moles of sulphate salt for every mole of monocalcium phosphate present in the initial mixture and the proportion of nitrogen in the composition being 2 to 25% by weight based on the weight of the composition.

3. A process for preparing granular fertilizer compositions which comprises forming a mixture containing water and, inter alia, at least one nitrate salt, at least one sulphate salt and triple superphosphate and granulating the mixture, said mixture being substantially free from single superphosphate, the nitrate salt being selected from the group consisting of ammonium nitrate, sodium nitrate, potassium nitrate and magnesium nitrate, the sulphate salt being selected from the group consisting of ammonium sulphate, ammonium sulphate nitrate, potassium sulphate, sodium sulphate and magnesium sulphate, the triple superphosphate providing at least 60% by weight of the total water-soluble $P_2O_5$ in the composition, the sulphate salt being present in such proportions as to provide substantially one to three moles of sulphate salt for every mole of monocalcium phosphate present in the initial mixture and the proportion of nitrogen in the composition being 2 to 25% by weight based on the weight of the composition.

4. A process for preparing granular fertilizer compositions which comprises forming a mixture containing water and, inter alia, at least one nitrate salt, at least one sulphate salt, potassium chloride and triple superphosphate and granulating the mixture, said mixture being substantially free from single superphosphate, the nitrate salt being selected from the group consisting of ammonium nitrate, sodium nitrate, potassium nitrate and magnesium nitrate, the sulphate salt being selected from the group consisting of ammonium sulphate, ammonium sulphate nitrate, potassium sulphate, sodium sulphate and magnesium sulphate, the triple superphosphate providing at least 60% by weight of the total water-soluble $P_2O_5$ in the composition, the sulphate salt being present in such proportions as to provide substantially one to three moles of sulphate salt for every mole of monocalcium phosphate present in the initial mixture and the proportion of nitrogen in the composition being 2 to 25% by weight based on the weight of the composition.

5. A process for preparing granular fertilizer compositions which comprises forming a mixture containing water and, inter alia, ammonium nitrate, ammonium sulphate and triple superphosphate and granulating the mixture, the triple superphosphate providing at least 60% by weight of the total water-soluble $P_2O_5$ in the composition, the ammonium sulphate being present in such proportions as to provide one to three moles of ammonium sulphate for every mole of monocalcium phosphate in the initial mixture and the proportion of nitrogen in the composition being 2 to 25% by weight based on the weight of the composition.

6. A process for preparing granular fertilizer compositions which comprises forming a mixture containing water and, inter alia, ammonium nitrate, ammonium sulphate, potassium chloride and triple superphosphate and granulating the mixture, the triple superphosphate providing at least 60% by weight of the total water-soluble $P_2O_5$ in the composition, the ammonium sulphate being present in such proportions as to provide one to three moles of ammonium sulphate for every mole of monocalcium phosphate in the initial mixture and the proportion of nitrogen in the composition being 2 to 25% by weight based on the weight of the composition.

7. A process for preparing granular fertilizer compositions which comprises forming a mixture containing water and, inter alia, ammonium nitrate, ammonium sulphate and triple superphosphate and granulating the mixture, said mixture being substantially free from single superphosphate, the triple superphosphate providing at least 60% by weight of the total water-soluble $P_2O_5$ in the composition, the ammonium sulphate being present in such proportions as to provide one to three moles of ammonium sulphate for every mole of monocalcium phosphate in the initial mixture and the proportion of nitrogen in the composition being 2 to 25% by weight based on the weight of the composition.

8. A process for preparing granular fertilizer compositions which comprises forming a mixture containing water and, inter alia, ammonium nitrate, ammonium sulphate, potassium chloride and triple superphosphate and granulating the mixture, said mixture being substantially free from single superphosphate, the triple superphosphate providing at least 60% by weight of the total water-soluble $P_2O_5$ in the composition, the ammonium sulphate being present in such proportions as to provide one to three moles of ammonium sulphate for every mole of monocalcium phosphate in the initial mixture and the proportion of nitrogen in the composition being 2 to 25% by weight based on the weight of the composition.

9. A process for preparing granular fertilizer compositions which comprises forming a mixture containing water and, inter alia, ammonium nitrate, ammonium sulphate and triple superphosphate and granulating the mixture, the triple superphosphate providing at least 60% by weight of the total water-soluble $P_2O_5$ in the composition, the ammonium sulphate being present in such proportions as to provide substantially one mole of ammonium sulphate for every mole of monocalcium phosphate in the initial mixture and the proportion of nitrogen in the composition being 2 to 25% by weight based on the weight of the composition.

10. A process for preparing granular fertilizer compositions which comprises forming a mixture containing water and, inter alia, ammonium nitrate, ammonium sulphate and triple superphosphate and granulating the mixture, said mixture being substantially free from single superphosphate, the triple superphosphate providing at least 60% by weight of the total water-soluble $P_2O_5$ in the composition, the ammonium sulphate being present in such proportions as to provide substantially one mole of ammonium sulphate for every mole of monocalcium phosphate in the initial mixture and the proportion of nitrogen in the composition being 2 to 25% by weight based on the weight of the composition.

11. A process for preparing granular fertilizer compositions which comprises forming a mixture containing water and, inter alia, ammonium nitrate, ammonium sulphate, potassium chloride and triple superphosphate and granulating the mixture, said mixture being substantially free from single superphosphate, the triple superphosphate providing at least 60% by weight of the total water-soluble $P_2O_5$ in the composition, the ammonium sulphate being present in such proportions as to provide substantially one mole of ammonium sulphate for every mole of monocalcium phosphate in the initial mixture and the proportion of nitrogen in the composition being 2 to 25% by weight based on the weight of the composition.

12. A process for preparing granular fertilizer compositions which comprises forming a mixture containing water and, inter alia, ammonium nitrate, ammonium sulphate and triple superphosphate and granulating the mixture, the triple superphosphate providing at least 60% by weight of the total water-soluble $P_2O_5$ in the composition, the ammonium sulphate being present in such proportions as to provide one to three moles of ammonium sulphate for every mole of monocalcium phosphate in the initial mixture, the proportion of nitrogen in the composition being 2 to 25% by weight based on the weight of the composition and the proportion of $P_2O_5$ in the composition being 7 to 30% by weight based on the weight of the composition.

13. A process for preparing granular fertilizer compositions which comprises forming a mixture containing water and, inter alia, ammonium nitrate, ammonium sulphate and triple superphosphate and granulating the mixture, said mixture being substantially free from single superphosphate, the triple superphosphate providing at least 60% by weight of the total water-soluble $P_2O_5$ in the composition, the ammonium sulphate being present in such proportions as to provide one to three moles of ammonium sulphate for every mole of monocalcium phosphate in the initial mixture, the proportion of nitrogen in the composition being 2 to 25% by weight based on the weight of the composition and the proportion of $P_2O_5$ in the composition being 7 to 30% by weight based on the weight of the composition.

References Cited by the Examiner

UNITED STATES PATENTS

| | | | |
|---|---|---|---|
| 2,680,680 | 6/1954 | Coleman | 71—40 |
| 2,903,349 | 9/1959 | Bryant | 71—64 |
| 2,971,832 | 2/1961 | Stewart et al. | 71—64 |
| 2,977,213 | 3/1961 | Maluta et al. | 71—64 |
| 3,005,696 | 10/1961 | Hignett et al. | 71—64 |
| 3,050,385 | 8/1962 | Parker | 71—64 |

OTHER REFERENCES

Perry, J. H., ed: The Chemical Engineer's Handbook, New York, McGraw-Hill Book Co., 3rd ed., 1950, p. 1186.

DONALL H. SYLVESTER, Primary Examiner.

ANTHONY SCIAMANNA, Examiner.

T. D. KILEY, Assistant Examiner.